No. 846,868. PATENTED MAR. 12, 1907.
R. SEVIC.
SHEARS.
APPLICATION FILED APR. 17, 1906.

Witnesses:
Inventor:
Rudolph Sevic,
By Dyrenforth, Dyrenforth & Lee,
Attys

UNITED STATES PATENT OFFICE.

RUDOLPH SEVIC, OF CHICAGO, ILLINOIS.

SHEARS.

No. 846,868.            Specification of Letters Patent.        Patented March 12, 1907.

Application filed April 17, 1906. Serial No. 312,113.

*To all whom it may concern:*

Be it known that I, RUDOLPH SEVIC, a citizen of the United States, residing at Chicago, in the county of Cook and State of Illinois, have invented a new and useful Improvement in Shears, of which the following is a specification.

My object is to provide certain improvements in the construction more especially of tailors' shears with a view to facilitating the operation of separating the blades when it is desired to clean them and to tighten and loosen the blades to adapt them for the ready cutting of different materials or materials of different thicknesses.

Figure 1:
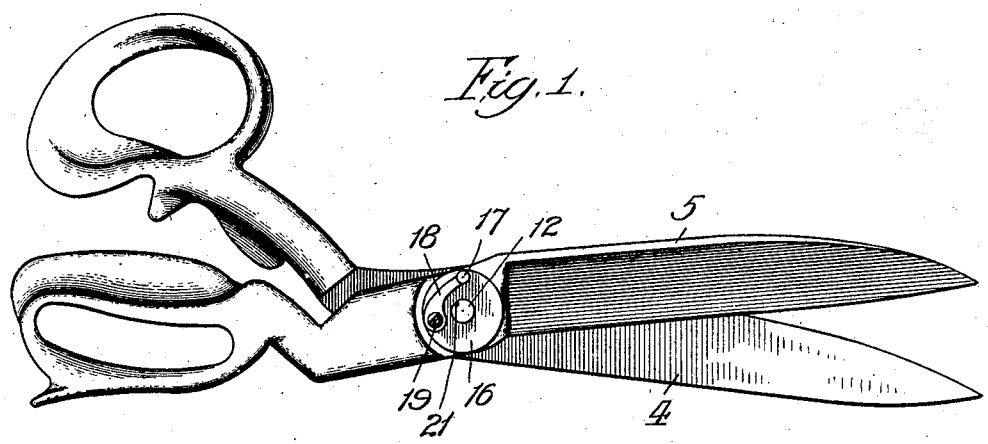
Figure 2:
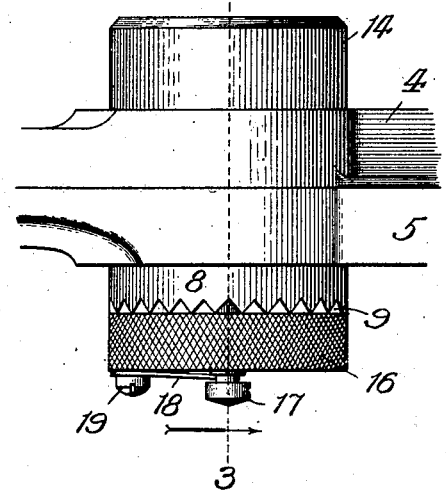
Figure 3:
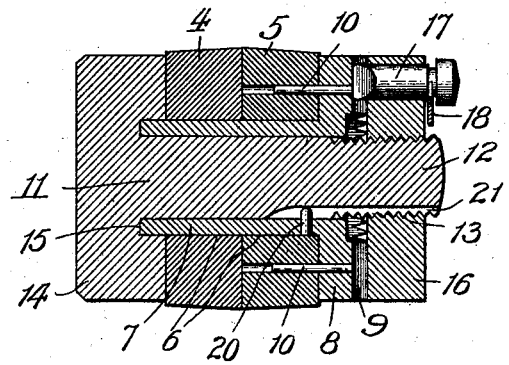

In the drawing, Figure 1 is a perspective view of a pair of tailors' shears provided with my improvements; Fig. 2, a broken and enlarged plan view taken at the joint, and Fig. 3 a section taken on the line 3 in Fig. 2.

4 and 5 are the blades of the shears, each provided with a large pivot-opening 6.

7 is a sleeve-piece terminating in a disk 8, formed with a ratchet-face 9. The sleeve fits through the coincident openings 6 of the blades, and the disk carries a pair of pins 10, fitting through perforations in the blade 5, as indicated, whereby in the working of the shears the sleeve and blade 5 turn together and the blade 4 turns upon the sleeve.

11 is a pin or bolt having a shank 12, which passes through the sleeve 7 and is provided along its free end portion with a thread 13. The head portion 14 of the pin is formed with an annular recess 15 to receive the end of the sleeve, as shown. Fitting the threaded portion 13 of the bolt or pin is a nut 16, in which is mounted a plunger-pawl 17, which is inwardly pressed by means of a spring 18, fastened, by means of a screw 19, against the outer face of the nut. In the sleeve 7 is a pin 20 to engage a longitudinally-extending slot 21 in the pin or bolt 12.

The pins 10 join the sleeve-piece 7 and blade 5, so that they are, in effect, permanently held to each other. In fastening the blades together the blade 4 is passed over the sleeve 7 against the blade 5, and the pin or bolt is then slipped through the sleeve in the manner indicated, the slot 21 receiving the pin 20. The nut 16 is then screwed upon the thread 13 until the plunger-pawl 17 engages the rack 9. The rack-engaging end of the pawl is beveled on opposite sides, so that the nut may be turned in either direction. It will be seen that the parts may be readily taken apart when the joint between the blades becomes clogged to permit cleaning of the joint, and the degree of pressure of the blades against each other may be regulated by tightening or loosening the nut 16, which is milled around its edge, as indicated in Fig. 2. When, for example, thin cloth is to be cut, which requires that the blades move tightly against each other, the nut 16 may be given a turn which will produce this adjustment of the blades. When heavier cloth is to be cut, which requires that the blades be relatively looser, the nut 16 may be given a turn in the opposite direction, producing the desired result.

The pins 10 and 20 have the effect of locking the blade 5, sleeve-piece 7, and pin 11 together, and the blade 4 is in pivotal relation to the other parts. Thus when the shears are held by the handle of the blade 5 the adjusting-nut 16 may be turned in either direction without danger of turning either of the other parts. The engagement of the pawl with the ratchet prevents any loosening of the parts during operation when once adjusted.

What I claim as new, and desire to secure by Letters Patent, is—

1. In a pair of shears, the combination with the blades, of a bolt passing freely through both of the blades at their fulcrum and having rocking engagement with one blade, a nut on the bolt operating by its turning in opposite directions to tighten and loosen the blades relative to each other, and means mounted relative to the nut and bolt operating to resist too ready turning of the nut in either direction on the bolt, for the purpose set forth.

2. In a pair of shears, the combination with the blades, of a bolt passing freely through both of the blades at their fulcrum and having rocking engagement with one blade, a nut on the bolt operating by its turning in opposite directions to tighten and loosen the blades relative to each other, and means operating to resist too ready turning of the nut in either direction on the bolt, comprising a ratchet carried by one of said blades and a pawl for engaging the ratchet during the turning of the nut in either direction.

3. In a pair of shears, the combination with the blades, of a bolt passing freely through both of the blades at their fulcrum and having rocking engagement with one blade, a nut on the bolt operating by its turning in opposite directions to tighten and loosen the blades relative to each other, and means for resisting too ready turning of the nut in either direction on the bolt, comprising a ratchet carried by one of said blades and a spring-pressed plunger-pawl passing through the nut for engaging the ratchet during the turning of the nut in either direction.

4. In a pair of shears, the combination with the blades, of a sleeve passing freely through both of the blades at their fulcrum and having rocking engagement with one blade, a bolt slidable through the sleeve and confined against independent rotation with relation to said sleeve and having a head bearing against the pivoted blade, a nut on the bolt operating by its turning in opposite directions to tighten and loosen the blades relative to each other, and means for resisting too ready turning of the nut in either direction, comprising a ratchet on the sleeve and a pawl on said nut for engaging said ratchet during the turning of said nut in either direction.

5. The combination, in a pair of shears, of a sleeve fastened to one blade and forming the pivot for the other blade, a disk on one end of the sleeve provided with a ratchet-face, a bolt passing through the sleeve and provided at its headed end with an annular recess for receiving the adjacent end of the sleeve, and near its opposite end with a longitudinal groove, a pin on the inner surface of said sleeve for engaging the groove in the bolt, a nut on the bolt and a spring-pressed plunger-pawl passing through the nut for engaging the ratchet, whereby the blades may be tightened or loosened by turning of the nut, and adjustment maintained by engagement of the pawl and ratchet.

RUDOLPH SEVIC.

In presence of—
  W. B. DAVIES,
  J. H. LANDES.